W. M. WADLEIGH.
WHIFFLETREE HOOK.
APPLICATION FILED MAR. 25, 1908.
949,556.
Patented Feb. 15, 1910.
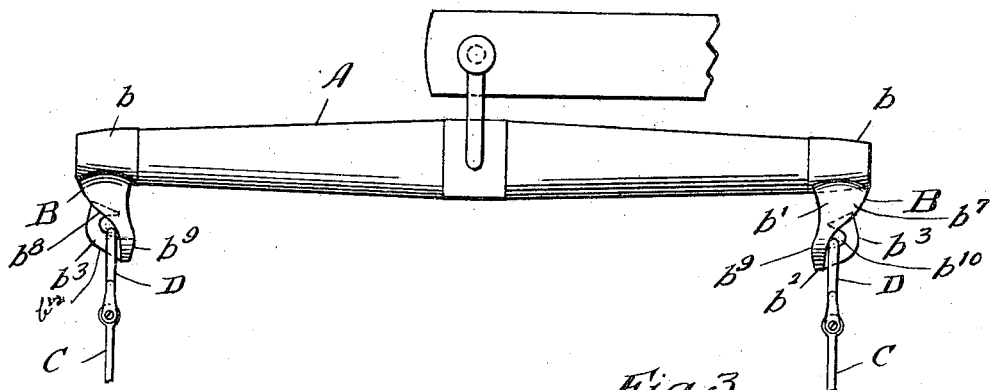
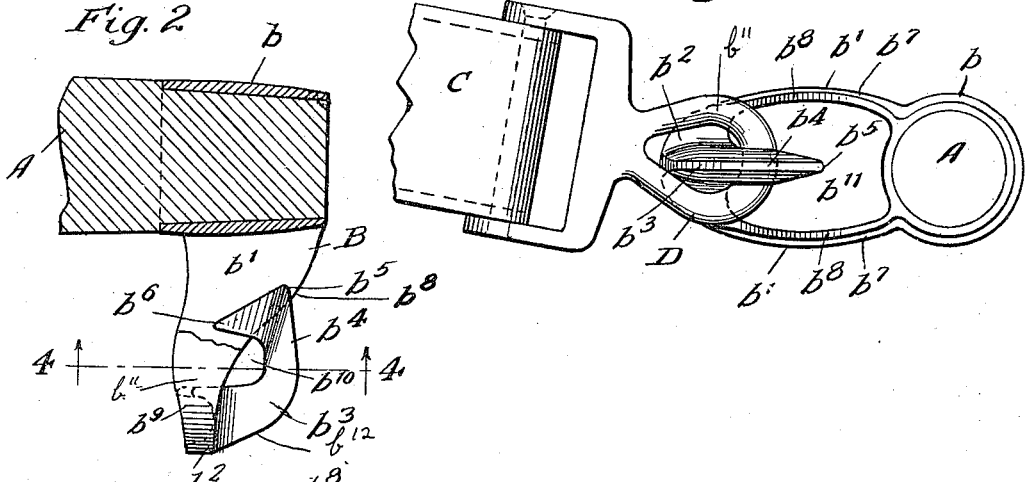
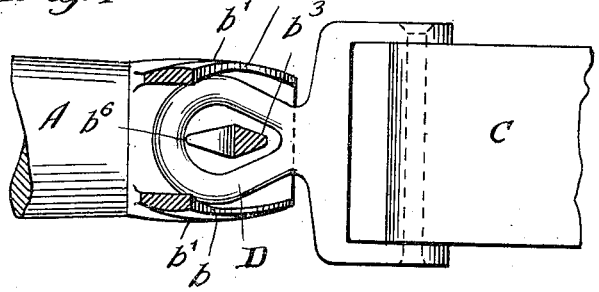
Witnesses:
Inventor:
William M. Wadleigh

UNITED STATES PATENT OFFICE.

WILLIAM M. WADLEIGH, OF CHICAGO, ILLINOIS.

WHIFFLETREE-HOOK.

949,556. Specification of Letters Patent. Patented Feb. 15, 1910.

Application filed March 25, 1908. Serial No. 423,204.

*To all whom it may concern:*

Be it known that I, WILLIAM M. WADLEIGH, a citizen of the United States, residing in Chicago, in the county of Cook and State of Illinois, have invented a new and useful Improvement in Whiffletree-Hooks, of which the following is a specification.

My invention relates to improvements in whiffletree hooks.

The object of my invention is to provide a one piece whiffletree hook of a simple, strong, efficient and durable construction, having an integral socket member for attachment to the whiffletree, and in which the hook will be of such construction as to enable the eye of the trace or tug to be readily and conveniently hooked or unhooked, and which at the same time will be safe and reliable against accidental unhooking, in which the free end or point of the hook will be effectually guarded from catching in the horse's tail or extraneous objects, and in which the trace-eye will be prevented from swinging inward over the shank portion of the hook or otherwise getting into a locked or cramped position where it is liable to be broken by strain of the tug or trace, and in which the trace-eye (thus prevented from swinging inward) in connection with the rearwardly curved or inclined shape of the prong or free arm of the hook will serve to guide the hook as a whole and the end of the whiffletree past extraneous objects against which the same might otherwise strike.

My invention consists in the means I employ to practically accomplish this object or result, as herein shown and described and more particularly specified in the claims. That is to say, it consists in a whiffletree having an integral socket portion fitting on the end of the whiffletree, in connection with a double shank portion, the upper and lower limbs of which are furnished with horizontally projecting wings having rearwardly inclined or curved outer edges to serve as guards to protect the point of the hook, and provided with an integral prong or free arm projecting horizontally and substantially at right angles to the outer or looped end of the double shank at its inner edge and rearwardly curved or inclined at its outer edge, said prong being furnished with a bent end and an integral guard projecting and extending inwardly between the upper and lower limbs of the double shank of the hook and forming a notch or socket to receive the trace-eye, the front or looped end of the double shank of the hook serving as a guard to prevent the trace-eye from swinging inward, and the guard on the bent end or rearwardly projecting portion of the prong or free arm of the hook coöperating with the rearwardly inclined wings of the upper and lower shank members to effectually lock the trace-eye in the hook so that it cannot become accidentally unhooked; while at the same time the trace-eye is easily and conveniently hooked and unhooked by simply turning the trace-eye outward until it can be slipped over the trace-eye guard on the free arm of the hook and over the point of the hook. The rearwardly curved or inclined outer edge of the prong of the hook in connection with means for preventing the trace-eye from swinging inward causes the trace and trace-eye and this rearwardly inclined outer edge of the hook prong and the inclined outer edges of the wings on the shank portion of the hook to guide or deflect the hook as a whole and the whiffletree past posts or extraneous objects against which the same might otherwise strike.

My invention also consists in the novel construction of parts and devices, and in the novel combinations of parts and devices herein shown and described.

In the accompanying drawing forming a part of this specification, Figure 1 is a plan view of a whiffletree furnished with hooks embodying my invention. Fig. 2 is an enlarged plan view partly in horizontal section. Fig. 3 is an end view of a whiffletree showing the hook in elevation, and Fig. 4 is a section on line 4—4 of Fig. 2.

In the drawing, A represents a whiffletree, B the swingle-tree hook and C the tug or trace having the customary eye D. The hook B is preferably of malleable iron or other tough metal, and comprises an integral socket member $b$, fitting the end of the whiffletree, an integral double shank member $b^1$, the upper and lower limbs of which have a curved or looped front end $b^2$ integrally joining them, and an integral free arm or prong $b^3$ springing or projecting horizontally and at its inner edge substantially at right angles to the double shank of the hook at the outer looped end $b^2$ thereof and having its outer edge $b^{12}$ rearwardly curved or inclined, and which prong or free arm $b^3$ is furnished with a rearwardly extending bent end or arm $b^4$ terminating in a point $b^5$ and furnished with an integral guard or projection $b^6$ which projects inward between the upper and lower limbs $b^1$ of the double shank. The upper and lower limbs of the double shank are each furnished with horizontal and outwardly projecting integral wings $b^7$ having curved or inclined edges $b^8$. The looped end $b^2$ of the double shank $b^1$ has a rearwardly projecting web or widened portion $b^9$ to form a broad base for the free arm or prong $b^3$ of the hook. The trace-eye guard $b^6$ on the free arm or prong of the hook forms with said prong a socket $b^{10}$ to receive the trace-eye, and the mouth $b^{11}$ of this socket, it will be seen from Figs. 1 and 2, extends between the upper and lower limbs $b^1$ of the double shank and is substantially closed by the outwardly extending wings $b^7$ of said shank limbs $b^1$. The open space between the upper and lower limbs $b^1$ of the double shank somewhat exceeds the vertical dimension or width of the trace-eye D so that when the trace-eye is turned outwardly, it may then be slipped inwardly between the shank limbs $b^1$ sufficiently to cause it to pass the guard $b^6$ and point $b^5$ of the hook and thus be unhooked. The free arm or prong $b^3$ of the hook projects centrally between the upper and lower limbs of the double shank $b^1$ and the bent end or arm $b^4$ of such prong extends between the guard wings $b^7$ so that these wings $b^7$ effectually guard and protect the point $b^5$ of the hook and thus prevent anything from catching on the hook point. The looped portion $b^2$ of the double shank $b^1$ of the hook is sufficiently extended vertically at $b^{11}$ to prevent the trace-eye from swinging inward over the double shank of the hook and thus getting into a kinked or locked position.

As will be readily understood from Figs. 1 and 2, the rearwardly curved or inclined outer edge $b^{12}$ of the hooked prong $b^3$ in connection with the vertical extension $b^{11}$ of the loop portion $b^2$ of the hook shank which prevents the trace-eye D from turning or swinging inward over the shank of the hook causes the trace C and trace-eye D to effectually guide or deflect the hook as a whole and the whiffletree past posts or extraneous objects against which the same might otherwise strike.

I claim:—

1. A one piece whiffletree hook having an integral socket member, integral upper and lower shank members furnished with outwardly projecting inclined guard wings extending to the outer end of said socket member, and having a looped or curved portion at their outer ends integrally joining them, and a free arm or prong springing from the curved front end of the double shank, and provided with a bent arm and a point and trace-eye guard projecting between and within the guard wings of the double shank, said curved outer end of the double shank serving as a guard to prevent the trace-eye from turning inward over the shank, and said guard on the prong or free arm of the hook in connection with the wings on the upper and lower limbs of the double shank serving as guards to lock the trace-eye from accidentally unhooking, and said guard wings on the upper and lower limbs of the double shank also serving as guards to protect the point of the hook, said whiffletree hook having an open space between the socket member and the point of the hook and between the guard wings of the shank members to admit the trace-eye in hooking and unhooking the same substantially as specified.

2. A one piece whiffletree hook having an integral socket member, integral double shank members and an integral prong member connected with the shank members at their front curved end, said curved end of the double shank serving as a guard to prevent the trace-eye from turning inward over the shank, said prong member having a guard and a point projecting between the upper and lower limbs of the double shank, said double shank having outwardly projecting guard wings extending to the outer end of said socket member, said whiffletree hook having an open space between the socket member and the point of the hook and between the guard wings of the shank members to admit the trace-eye in hooking and unhooking the same substantially as specified.

WILLIAM M. WADLEIGH.

Witnesses:
  H. M. MUNDAY,
  EDMUND ADCOCK.